United States Patent
Park et al.

(10) Patent No.: US 9,629,085 B2
(45) Date of Patent: Apr. 18, 2017

(54) RECEPTION NODE AND TRANSMISSION NODE FOR SAVING ENERGY OF RECEPTION NODE, AND COMMUNICATION METHOD THEREOF

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Chang Soon Park, Chungju-si (KR); Young Soo Kim, Seoul (KR); Hyo Sun Hwang, Seoul (KR); Jang Won Lee, Seoul (KR); Sung Yeon Kim, Seoul (KR); Hyun Sik Jung, Seoul (KR)

(73) Assignees: Samsung Electronics Co., Ltd., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 217 days.

(21) Appl. No.: 14/176,573

(22) Filed: Feb. 10, 2014

(65) Prior Publication Data
US 2015/0043402 A1    Feb. 12, 2015

(30) Foreign Application Priority Data
Aug. 12, 2013    (KR) .......................... 10-2013-0095440

(51) Int. Cl.
G08C 17/00    (2006.01)
H04W 52/02    (2009.01)

(52) U.S. Cl.
CPC ... H04W 52/0229 (2013.01); H04W 52/0216 (2013.01)

(58) Field of Classification Search
None
See application file for complete search history.

(56) References Cited

U.S. PATENT DOCUMENTS

| | | | |
|---|---|---|---|
| 7,924,756 B2 * | 4/2011 | Son ................. | H04W 52/0216 370/311 |
| 2009/0103437 A1 | 4/2009 | Kim et al. | |

(Continued)

FOREIGN PATENT DOCUMENTS

| | | |
|---|---|---|
| JP | 2012-517739 A | 8/2012 |
| KR | 10-2008-0012730 A | 2/2008 |

(Continued)

OTHER PUBLICATIONS

Sun, Yanjun et al. "RI-MAC: a receiver-initiated asynchronous duty cycle MAC protocol for dynamic traffic loads in wireless sensor networks." Proceedings of the 6th ACM conference on Embedded network sensor systems. ACM, 2008 (14 pages, in English).

Primary Examiner — Afshawn Towfighi
(74) Attorney, Agent, or Firm — NSIP Law (57) ABSTRACT

A communication method of a transmission node includes generating information of a transmission unavailable time period of the transmission node in a reception available time period of a reception node, and transmitting, to the reception node, the information of the transmission unavailable time period. The reception node operates in a sleep state based on the information of the transmission unavailable time period.

24 Claims, 10 Drawing Sheets (56) References Cited

U.S. PATENT DOCUMENTS

| | | | |
|---|---|---|---|
| 2010/0118797 A1* | 5/2010 | Park | H04L 1/0025 370/329 |
| 2010/0226343 A1* | 9/2010 | Hsu | H04W 74/02 370/336 |
| 2011/0243050 A1* | 10/2011 | Yanover | H04W 52/0258 370/311 |
| 2012/0033584 A1 | 2/2012 | Corroy | |
| 2012/0069869 A1* | 3/2012 | Jeong | H04L 12/40013 375/132 |
| 2014/0105080 A1* | 4/2014 | Kawamoto | H04L 69/08 370/310 |

FOREIGN PATENT DOCUMENTS

| | | |
|---|---|---|
| KR | 10-2008-0068987 A | 7/2008 |
| KR | 10-2010-0006110 A | 1/2010 |
| KR | 10-2010-0061282 A | 6/2010 |
| KR | 10-2011-0000482 A | 1/2011 |

* cited by examiner

RECEPTION NODE AND TRANSMISSION NODE FOR SAVING ENERGY OF RECEPTION NODE, AND COMMUNICATION METHOD THEREOF

CROSS-REFERENCE TO RELATED APPLICATION

This application claims the benefit under 35 USC 119(a) of Korean Patent Application No. 10-2013-0095440, filed on Aug. 12, 2013, in the Korean Intellectual Property Office, the entire disclosure of which is incorporated herein by reference for all purposes.

BACKGROUND

1. Field

The following description relates to a reception node and a transmission node for saving energy of the reception node, and a communication method thereof.

2. Description of Related Art

The Institute of Electrical and Electronics Engineers (IEEE) 802.15.4e standard is an amendment of the low-rate wireless personal area networks (LR-WPAN) protocol standard, that is, the IEEE 802.15.4. The IEEE 802.15.4e standard includes a receiver initiated transmission (RIT) ensuring communication using low power. The RIT may be used in a non-beacon mode in which a beacon is not used. When a node continuously operates in a listening state or a sleep state, a transmission node may not obtain information associated with an operation state of a reception node in the non-beacon mode.

In the non-beacon mode, the RIT may enable the reception node to allow the transmission node to recognize a reception available time period of the reception node. In the RIT, the reception node may transmit, to the transmission node, information associated with a listen interval of the reception node, using an RIT data request message. The transmission node may receive, from the reception node, the information associated with the listen interval of the reception node, and transmit data during the listen interval of the reception node.

Due to a schedule for data transmission from the transmission node to another reception node during the listen interval of the reception node, or another reason, the transmission node may fail to transmit data to the reception node. In this instance, although the transmission node does not transmit the data, unnecessary power consumption may occur in the reception node resulting from a conversion from a sleep state to a listening state for receiving data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a communication method of a transmission node, including generating information of a transmission unavailable time period of the transmission node in a reception available time period of a reception node, and transmitting, to the reception node, the information of the transmission unavailable time period. The reception node operates in a sleep state based on the information of the transmission unavailable time period.

The method may further include receiving, from the reception node, scheduling information including the reception available time period.

The transmitting may include transmitting, to the reception node, the information of the transmission unavailable time period, along with data.

The method may further include determining whether the transmission unavailable time period is present in the reception available time period.

The generating may include generating the information of the transmission unavailable time period based on a result of the determining.

The generating may include generating the information of the transmission unavailable time period in a bitmap format.

The generating may include generating the information of the transmission unavailable time period in a form of a number of unit times in which transmission is unavailable until a subsequent transmission.

The generating may include generating the information of the transmission unavailable time period in a form of an indicator.

The indicator may indicate that a corresponding data transmission is a final transmission in the reception available time period.

The transmission node and the reception node may operate in a non-beacon mode in which a beacon is not used.

A non-transitory computer-readable storage medium may store a program including instructions to cause a computer to perform the method.

In another general aspect, there is provided a communication method of a reception node, including receiving, from a transmission node, information of a transmission unavailable time period of the transmission node in a reception available time period of the reception node, and operating in a sleep state during the transmission unavailable time period.

The method may include transmitting, to the transmission node, scheduling information including the reception available time period.

The transmitting may include periodically transmitting the scheduling information to the transmission node.

The information of the transmission unavailable time period may be in at least one of a bitmap format, a form of a number of unit times in which transmission is unavailable until a subsequent transmission, and a form of an indicator.

In still another general aspect, there is a transmission node including a generator configured to generate information of a transmission unavailable time period of the transmission node in a reception available time period of a reception node, and a transmitter configured to transmit, to the reception node, the information of the transmission unavailable time period. The reception node may operate in a sleep state based on the information of the transmission unavailable time period.

The transmission node may further include a receiver configured to receive, from the reception node, scheduling information including the reception available time period.

The transmitter may be configured to transmit, to the reception node, the information of the transmission unavailable time period, along with data.

The generator may be configured to generate the information of the transmission unavailable time period in at least one of a bitmap format, a form of a number of unit times in which transmission is unavailable until a subsequent transmission, and a form of an indicator.

In yet another general aspect, there is provided a reception node, including a transmitter configured to transmit, to a transmission node, scheduling information including a reception available time period of the reception node, and a state manager configured to maintain the reception node in a sleep state during a transmission unavailable time period of the transmission node in the reception available time period.

The reception node may further include a receiver configured to receive, from the transmission node, information of the transmission unavailable time period.

The reception node may be unavailable for reception in the sleep state.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, a node may be understood as a term including, for example, user terminals including a smart phone, customer devices including a smart television (TV), a personal computer (PC), a laptop computer, and networking devices including an access point (AP) and a router.

Figure 1:
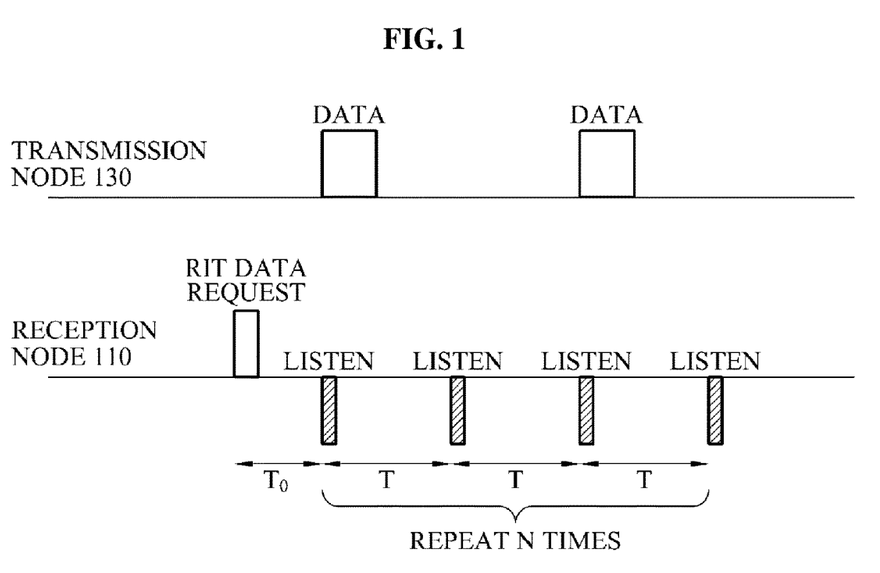
FIG. 1 is a diagram illustrating an example of an operation of a receiver initiated transmission (RIT) according to the Institute of Electrical and Electronics Engineers (IEEE) 802.15.4e standard.

FIG. 1 is a diagram illustrating an example of an operation of a receiver initiated transmission (RIT) according to the Institute of Electrical and Electronics Engineers (IEEE) 802.15.4e standard. The RIT supported to operate using low power in a non-beacon-enabled personal area network (PAN) may be initiated when a reception node sends an RIT data request, using an unslotted carrier sense multiple access with collision avoidance (CSMA/CA). The RIT data request may provide information of a period of time during which the corresponding reception node is listening to a subsequent data reception. The RIT data request may include $T_0$ denoting a period of time until a first listen interval, N denoting a number of times listen intervals are repeated, T denoting a period of time of a single listen interval, and/or other information known to one of ordinary skill in the art.

Referring to FIG. 1, an operation, using a scheme of an RIT, between a reception node 110 and a transmission node 130 that is performed based on time, is described. The reception node 110 schedules four listen intervals, and notifies, through an RIT data request, the transmission node 130 that the four listen intervals are scheduled. The transmission node 130 transmits data during a first listen interval and a third listen interval, among the four listen intervals.

Data to be transferred by the transmission node 130 may be absent in the listen intervals of the reception node 110. Also, a corresponding listen interval may be a period of time scheduled for communication between the transmission node 130 and another node. Due to various reasons, the listen intervals scheduled and notified about by the reception node 110 may include an interval during which the transmission node 130 is unavailable to transmit data.

Figure 2:
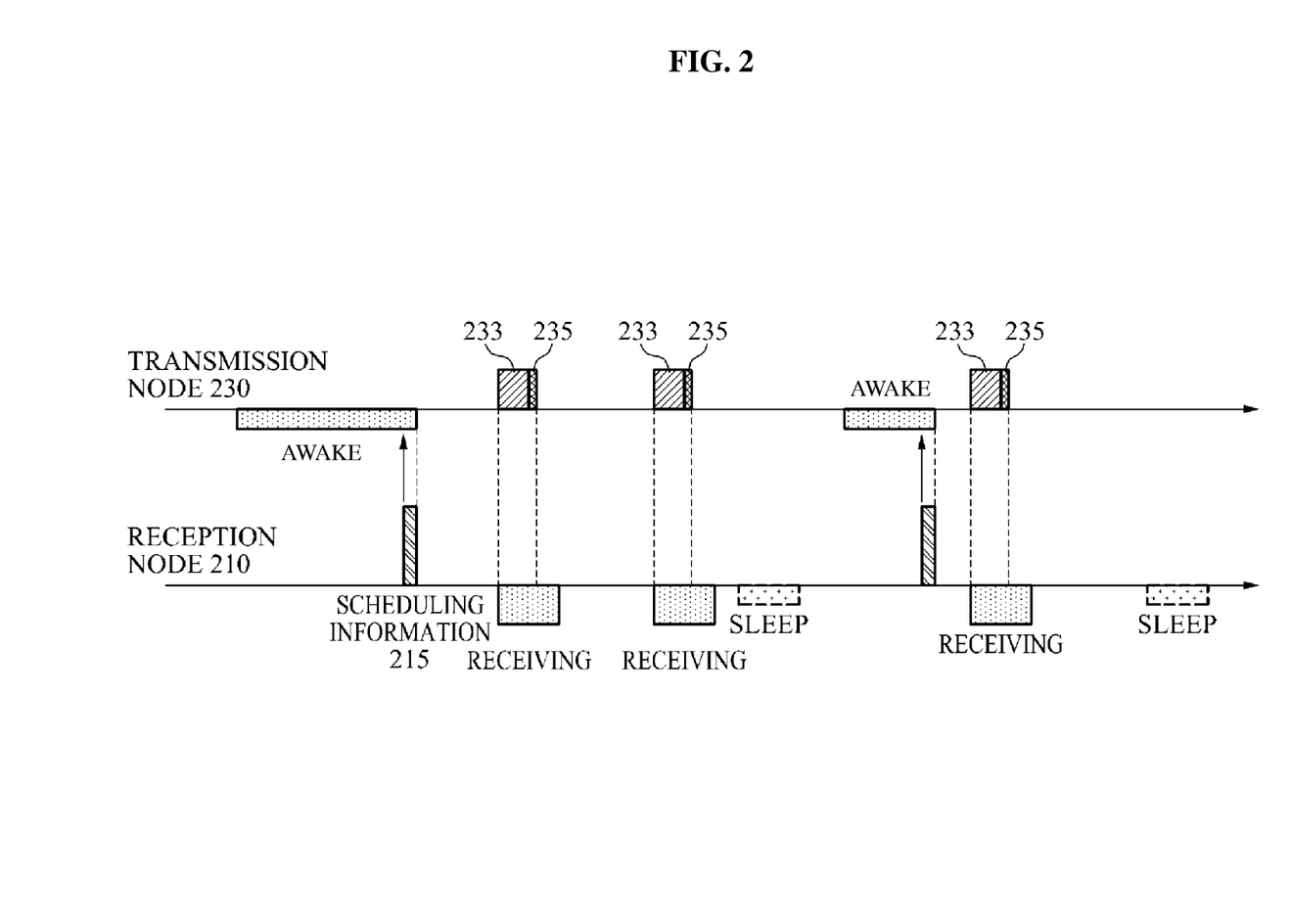
FIG. 2 is a diagram illustrating an example of an operation of a reception node and a transmission node to save energy of the reception node.

FIG. 2 is a diagram illustrating an example of operations of a reception node 210 and a transmission node 230 to save energy of the reception node 210. Referring to FIG. 2, in a connection pair including the reception node 210 and the transmission node 230, the reception node 210 periodically transfers, to the transmission node 230, scheduling information 215 including a reception available time period during which the reception node 210 is available to receive data. The reception available time period of the reception node 210 may refer to a time interval or a period of time during which the reception node 210 is available to receive data or a signal transferred from the transmission node 230.

The transmission node 230 in a sleep state wakes up ("awake") aperiodically, and receives the scheduling information 215 of the reception node 210, thereby transmitting data 233 to the reception node 210 in accordance with the reception available time period ("receiving") of the reception node 210.

A period of time or a time interval corresponding to an transmission unavailable time period of the transmission node 230 may be present in the reception available time period of the reception node 210 that is included in the scheduling information 215 transmitted to the transmission node 230 by the reception node 210. The transmission unavailable time period of the transmission node 230 may refer to a time interval or a period of time during which the transmission node 230 is unavailable to transmit the data 233 or a signal in the reception available time period of the reception node 210. Since the transmission unavailable time period is a time resource that may not be used by the transmission node 230, the transmission unavailable time period may be referred to as an unavailable resource.

The reception node 210 may not recognize the transmission unavailable time period of the transmission node 230. Thus, the reception node 210 may listen to receive the data 233 transmitted by the transmission node 230, based on the scheduling information 215, irrespective of a presence of the transmission unavailable time period of the transmission node 230.

In an example, the transmission node 230 transmits, to the reception node 210, information 235 of the transmission unavailable time period to reduce an amount of time in which the reception node 210 may unnecessarily listen. Thus, wasted time resources and power consumption that result from reception listening may also be reduced.

In FIG. 2, the transmission node 230 receives the scheduling information 215 from the reception node 210, and obtains the period of time or the time interval in which the reception node 210 is listening to perform communication. When the data 233 is transmitted in a listen interval or the reception available time period of the reception node 210, the transmission node 230 transmits, to the reception node 210, the information 235 of the transmission unavailable time period of the transmission node 230, in addition to or along with the data 233 to be transmitted to the reception node 210.

The information 235 of the transmission unavailable time period may be provided in, for example, at least one of a bitmap format with respect to the listen interval of the reception node 210, a form of a number of unit times in which transmission is unavailable until a subsequent data transmission, and a form of an indicator indicating a corresponding data transmission is a final transmission when last data is transmitted. For example, the indicator may be one bit information indicating an end of data (EOD). The number of unit times may refer to a number of listen intervals of the reception node 210.

The reception node 210 receiving the information 235 of the transmission unavailable time period maintains an operation state to be in a sleep state ("sleep") in lieu of reception listening, in a time resource corresponding to the transmission unavailable time period of the transmission node 230 among time resources scheduled to listen to receive data of the transmission node 230.

When the transmission node 230 does not transmit, to the reception node 210, the information 235 of the transmission unavailable time period, the reception node 210 may not recognize the transmission unavailable time period of the transmission node 230. Thus, the reception node 210 may listen to receive the data 233 transmitted by the transmission node 230, based on the scheduling information 215.

In this example, a period of time in which the reception node unnecessarily listens to a reception may be controlled based on the information 235 of the transmission unavailable time period of the transmission node 230. Accordingly, an unnecessary reception listening may be avoided, and power consumption may also be reduced.

Figure 3:
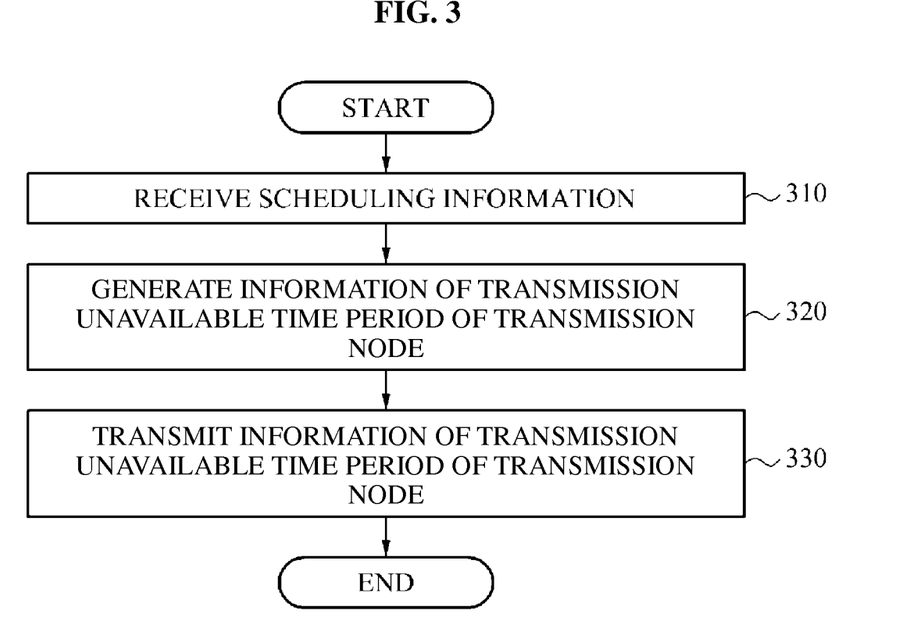
FIG. 3 is a flowchart illustrating an example of a communication method of a transmission node.

FIG. 3 is a flowchart illustrating an example of a communication method of a transmission node. Referring to FIG. 3, in operation 310, the transmission node receives, from a reception node, scheduling information including a reception available time period of the reception node.

In operation 320, the transmission node generates information of a transmission unavailable time period of the transmission node in the reception available time period of the reception node. The transmission node may generate the information of the transmission unavailable time period in at least one of a bitmap format with respect to a listen interval of the reception node, a form of a number of unit times, and a form of an indicator. The number of unit times may refer to a number of listen intervals during which transmission is unavailable until a subsequent data transmission. The indicator may indicate a corresponding data transmission is a final transmission in the reception available time period. An operation in which the transmission node transmits, to the reception node, information of the transmission unavailable time period will be described with reference to FIGS. 6 through 8.

In operation 330, the transmission node transmits, to the reception node, the information of the transmission unavailable time period of the transmission node. The transmission node may transmit, to the reception node, the information of the transmission unavailable time period, in addition to or along with data to be transmitted to the reception node. In an example, the transmission node and the reception node may operate in a non-beacon mode in which a beacon is not used.

Figure 4:
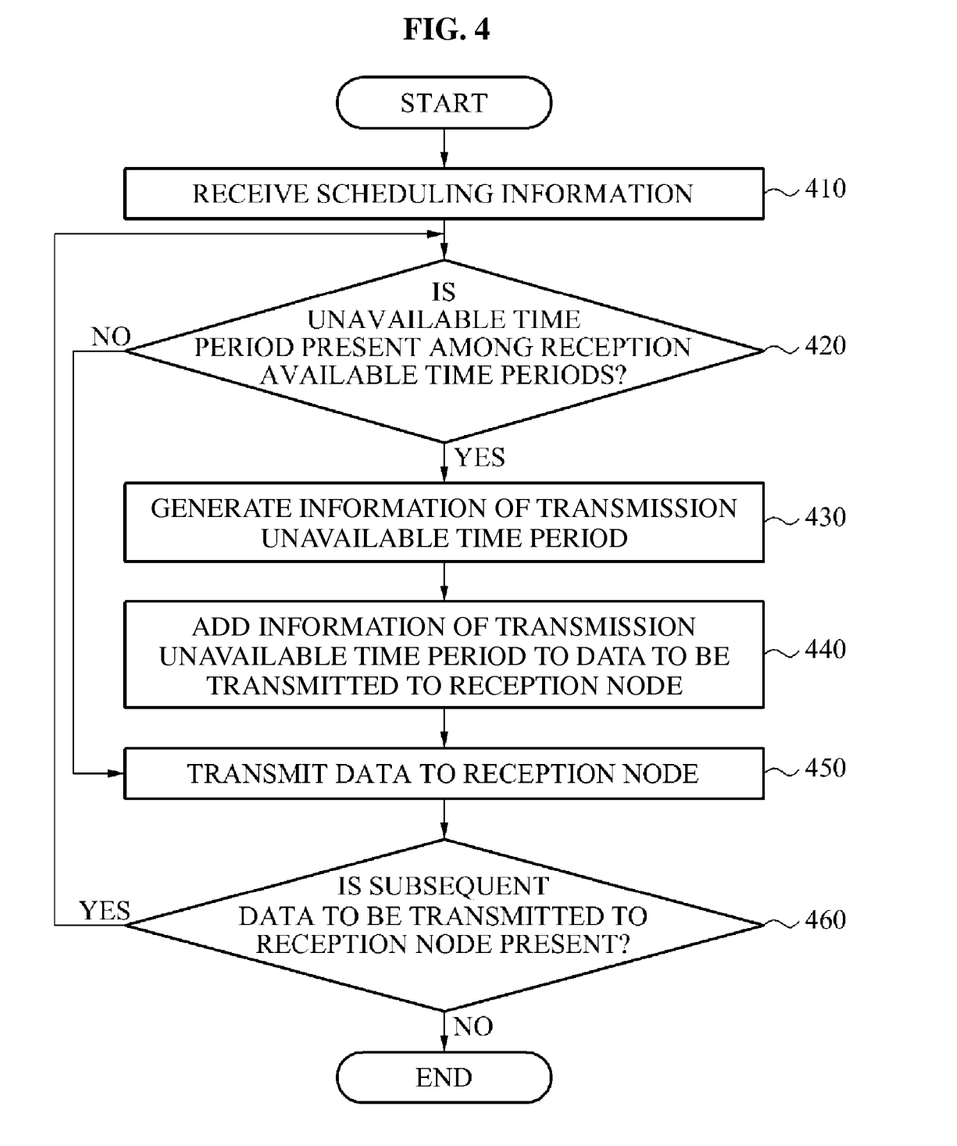
FIG. 4 is a flowchart illustrating another example of a communication method of a transmission node.

FIG. 4 is a flowchart illustrating another example of a communication method of a transmission node. Referring to FIG. 4, in operation 410, the transmission node receives, from a reception node, scheduling information including one or more reception available time periods of the reception node.

In operation 420, the transmission node determines whether a transmission unavailable time period of the transmission node is present among the reception available time periods of the reception node. When the transmission unavailable time period is determined to be present among the reception available time periods, the transmission node continues in operation 430. Otherwise, the transmission node continues in operation 450.

In operation 430, the transmission node generates information of the transmission unavailable time period.

In operation 440, the transmission node adds the information of the transmission unavailable time period to data to be transmitted to the reception node.

In operation 450, the transmission node transmits, to the reception node, the data to which the information of the transmission unavailable time period may be added.

In operation 460, the transmission node determines whether subsequent data to be transmitted to the reception node is present. When the subsequent data to be transmitted is determined to be absent, the transmission node ends the method. When the subsequent data to be transmitted is determined to be present, the transmission node returns to operation 420.

Figure 5:
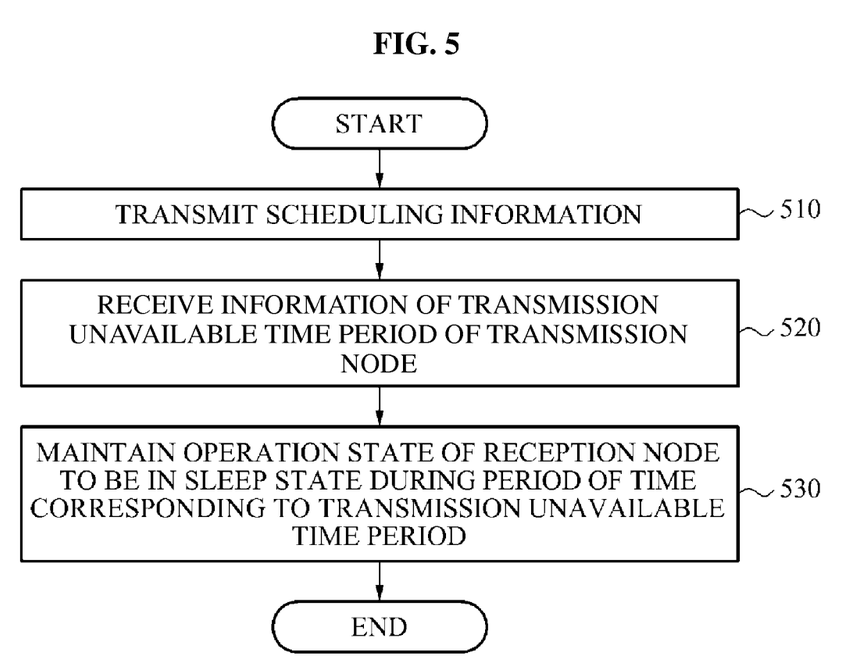
FIG. 5 is a flowchart illustrating an example of a communication method of a reception node.

FIG. 5 is a flowchart illustrating an example of a communication method of a reception node. Referring to FIG. 5, in operation 510, the reception node transmits, to a transmission node, scheduling information including a reception available time period of the reception node.

In operation 520, the reception node receives, from the transmission node, information of a transmission unavailable time period of the transmission node in the reception available time period of the reception node.

In operation 530, the reception node maintains an operation state of the reception node to be in a sleep state (e.g., of non-reception listening) during a period of time corresponding to the transmission unavailable time period of the transmission node in the reception available time period of the reception node, based on the information of the transmission unavailable time period. Accordingly, the reception node receives information of the transmission unavailable time period of the transmission node, that is, an unavailable resource, to avoid unnecessary reception listening and reduce power consumption resulting from the unnecessary reception listening.

Figure 6:
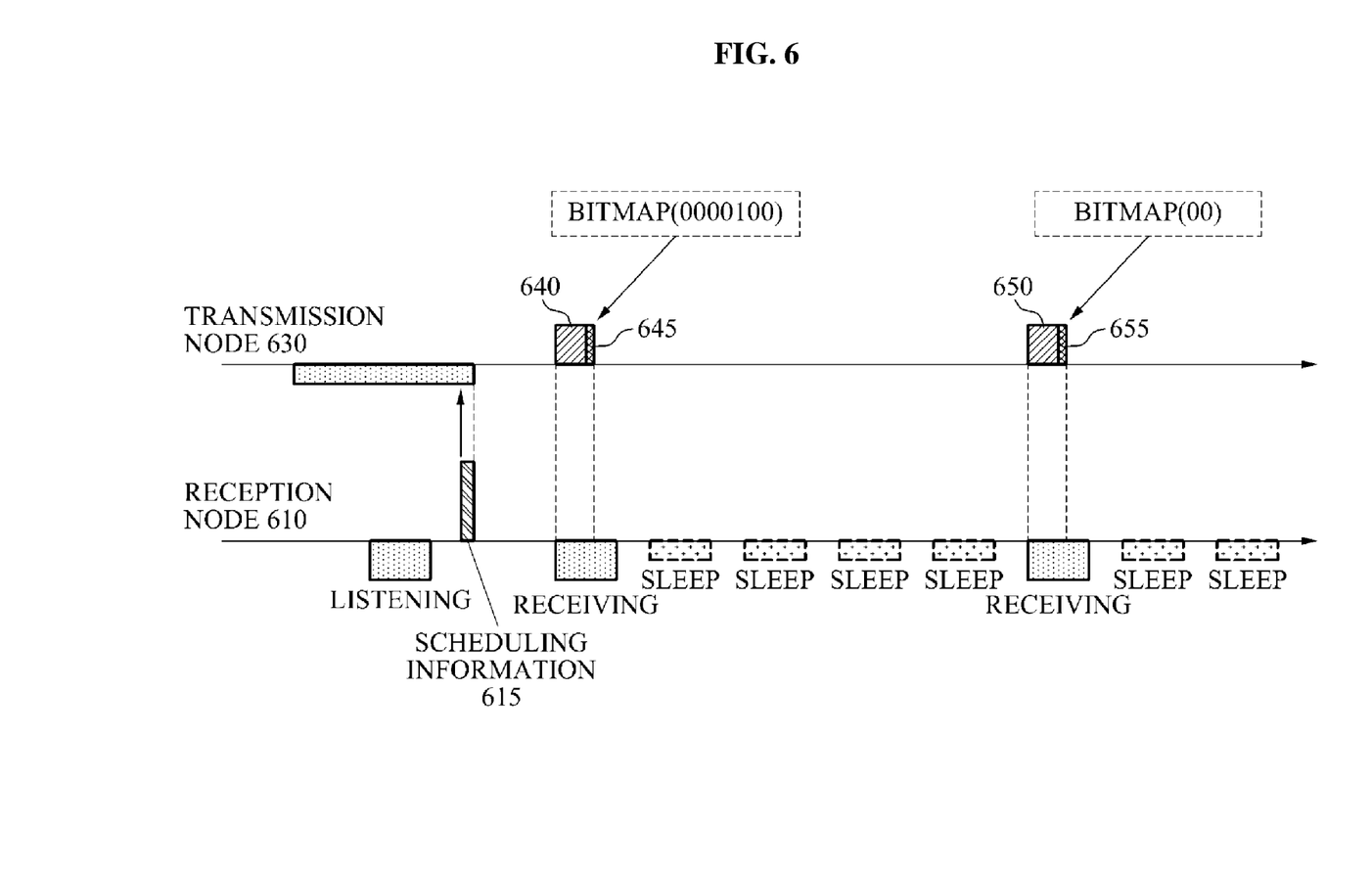
FIG. 6 is a diagram illustrating an example of an operation in which information of a transmission unavailable time period of a transmission node is provided in a bitmap format.

FIG. 6 is a diagram illustrating an example of an operation in which information of a transmission unavailable time period of a transmission node 630 is provided in a bitmap format. Referring to FIG. 6, the operation between a reception node 610 and the transmission node 630 is performed, in which the transmission node 630 transmits, to the reception node 610, bitmap format information 645 and 655 of the transmission unavailable time period of the transmission node 630.

The transmission node 630 transmits, to the reception node 610, the bitmap format information 645 and 655 of the transmission unavailable time period in addition to data 640 and 650, respectively, based on scheduling information 615 received from the reception node 610. The transmission unavailable time period may refer to a period of time, among periods ("listening" and "receiving") of time available for reception of the reception node 610, during which data transmission is unavailable.

For example, when the scheduling information 615 received from the reception node 610 indicates N=8 (00001000), N may indicate a number of times listen intervals are repeated in the reception node 610. Since a range of N repetitions in the reception node 610 may be between "0" and "255", a size of a bitmap may be maximized to approximately 32 bytes, which corresponds to 256 bits.

The scheduling information 615, for example, "00001000", received from the reception node 610 may indicate "8". Thus, the transmission node 630 may recognize that the reception node 610 is available for reception during a period of time corresponding to eight listen intervals.

When the transmission unavailable time period during the period of time corresponding to eight listen intervals, that is, the periods of time available for reception, corresponds to each of a first listen interval through a fourth listen interval, a sixth listen interval, and a seventh listen interval, the transmission node 630 may generate the bitmap format information 645, for example, "0000100". The reception node 610 may receive, from the transmission node 630, the bitmap format information 645, for example, "0000100", in addition to the data 640, and maintain an operation state to be in a sleep state ("sleep") during the first listen interval through the fourth listen interval.

Subsequently, the transmission node 630 may generate and transmit, to the reception node 610, the bitmap format information 655, for example, "00", in addition to the data 650. The reception node 610 may maintain the operation state to be in the sleep state during the sixth listen interval and the seventh listen interval.

Figure 7:
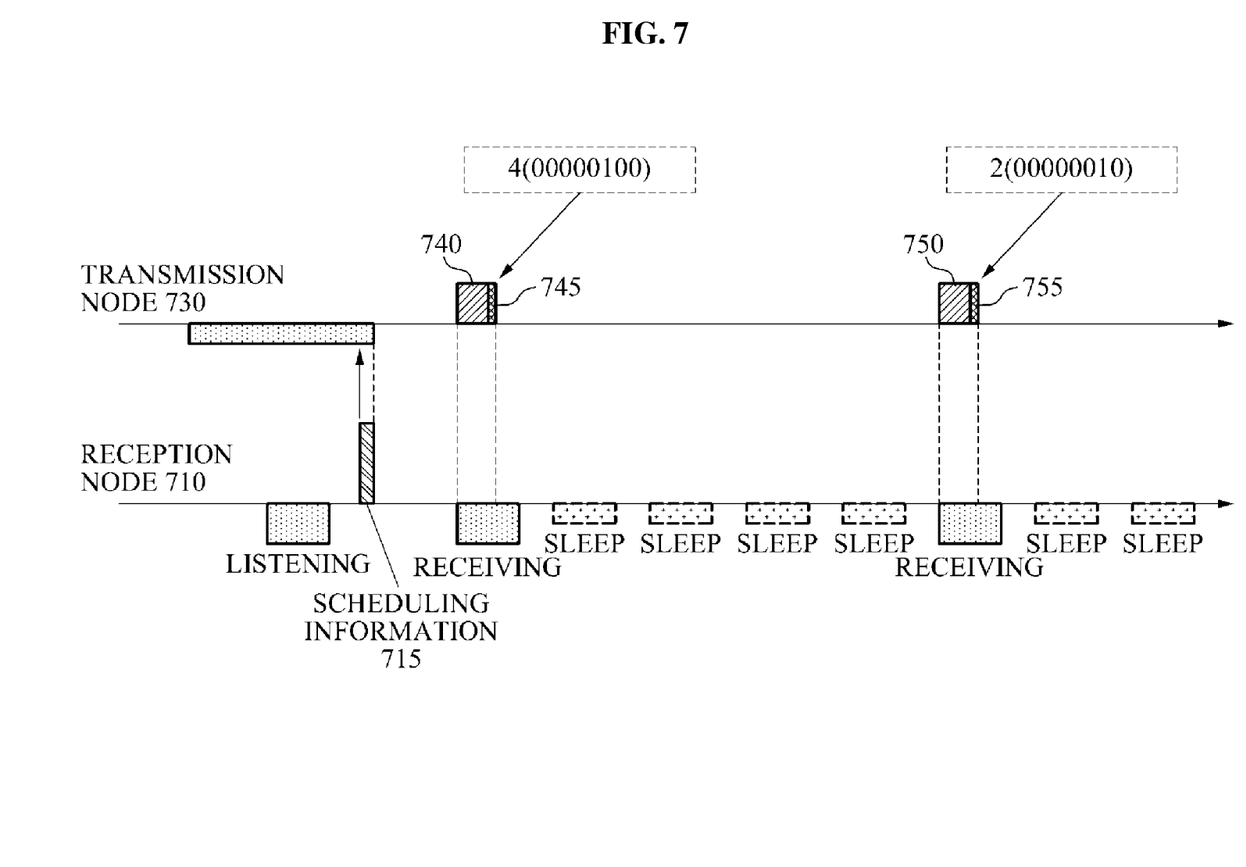
FIG. 7 is a diagram illustrating an example of an operation in which information of a transmission unavailable time period of a transmission node is provided in a form of a number of unit times.

FIG. 7 is a diagram illustrating an example of an operation in which information 745 and 755 of a transmission unavailable time period of a transmission node 730 is provided in a form of a number of unit times. Referring to FIG. 7, the operation between a reception node 710 and the transmission node 730 is performed, in which the transmission node 730 transmits, to the reception node 710, the information 745 and 755 of the transmission unavailable time period of the transmission node 730 in the form of the number of unit times. The number of unit times may refer to a number of listen intervals of the reception node 710.

The transmission node 730 transmits, to the reception node 710, information 745 of the transmission unavailable time period in the form of the number of unit times, in addition to data 740, based on scheduling information 715 received from the reception node 710. The transmission unavailable time period may refer to, among listen intervals ("listening" and "receiving") of the reception node 710, a period of time during which data transmission is unavailable until a subsequent data transmission.

That is, the transmission node 730 transmits, to the reception node 710, the information 745 of the transmission unavailable time period, among scheduled time resources of the reception node 710, in the form of the number of the unit times, in addition to the data 740. In this example, the transmission node 730 may represent a number of listen intervals during which transmission is unavailable until a subsequent data transmission, on an 8-bit basis.

For example, when the number of listen intervals during which transmission is unavailable until a subsequent data transmission corresponds to "4", the transmission node 730 may transmit, to the reception node 710, a value, for example, "00000100", corresponding to "4", in addition to the data 740. When the value, for example, "00000100", corresponding to "4", which is the number of unit times of the transmission unavailable time period, and the data 740 are received, the reception node 710 may maintain an operation state to be in a sleep state ("sleep") during a first listen interval through a fourth listen interval before subsequent data is received. When the first listen interval through the fourth listen interval end, the reception node 710 may receive, from the transmission node 730, the information 755 of the transmission unavailable time period being a value, for example, "00000010", corresponding to "2", in addition to data 750. Based on the information 755, the reception node 710 may maintain the operation state to be in the sleep state during a sixth listen interval and a seventh listen interval.

Figure 8:
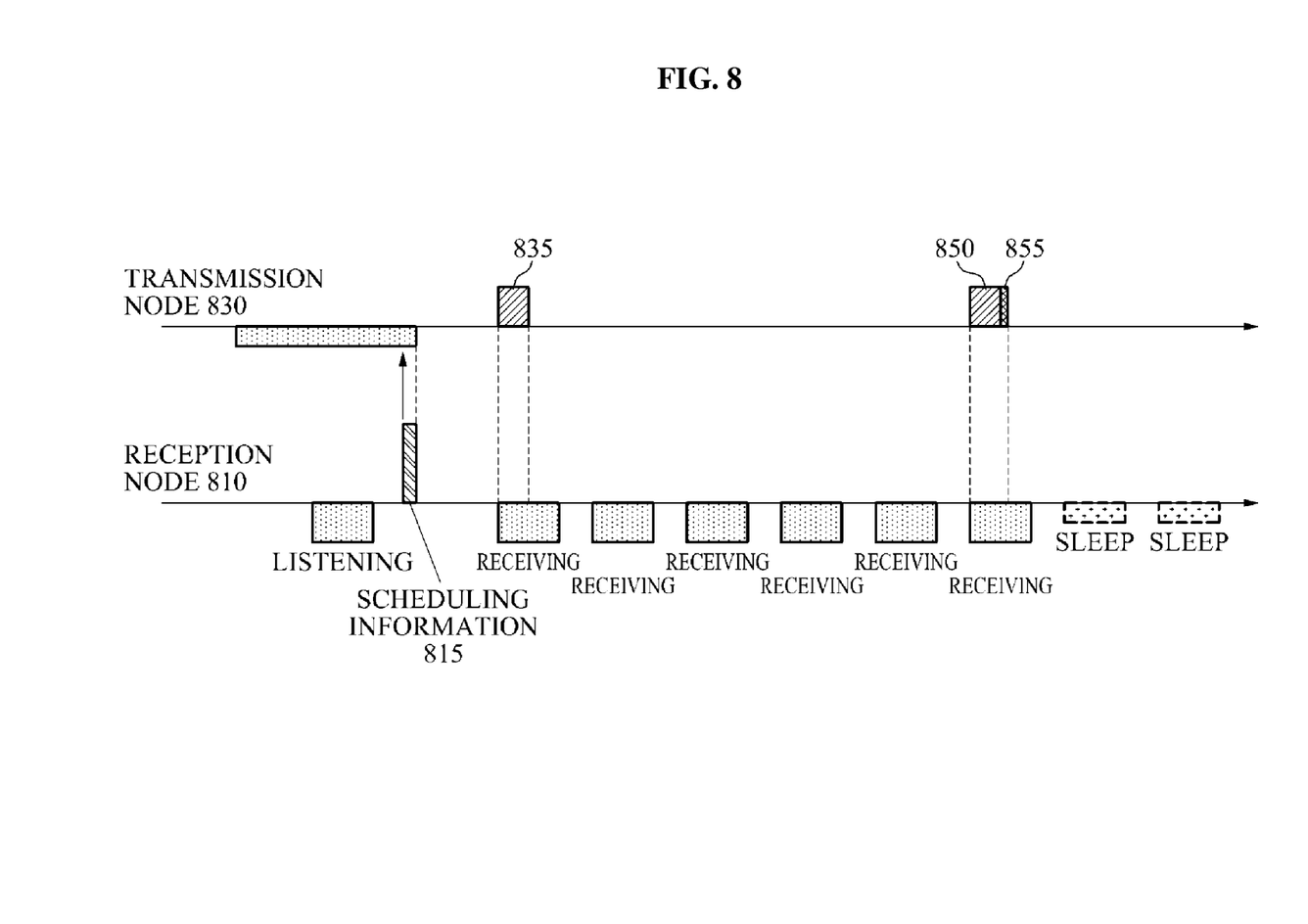
FIG. 8 is a diagram illustrating an example of an operation in which information of a transmission unavailable time period of a transmission node is provided in a form of an indicator.

FIG. 8 is a diagram illustrating an example of an operation in which information of a transmission unavailable time period of a transmission node 830 is provided in a form of an indicator. Referring to FIG. 8, the operation between a reception node 810 and the transmission node 830 is performed, in which the transmission node 830 transmits, to the reception node 810, information of the transmission unavailable time period in the form of the indicator.

The transmission node 830 transmits data 835 to the reception node 810 based on scheduling information 815 received from the reception node 810. In this example, the reception node 810 maintains an operation state to be in a reception listening state ("receiving") before a one bit indicator 855 indicating that corresponding data 850 is last data, is received from the transmission node 830.

The transmission node 830 transmits, to the reception node 810, the one bit indicator 855 indicating that the corresponding data 850 is last data, in addition to the data 850 to be finally transmitted. Thus, the reception node 810 maintains the operation state to be in a sleep state.

Figure 9:
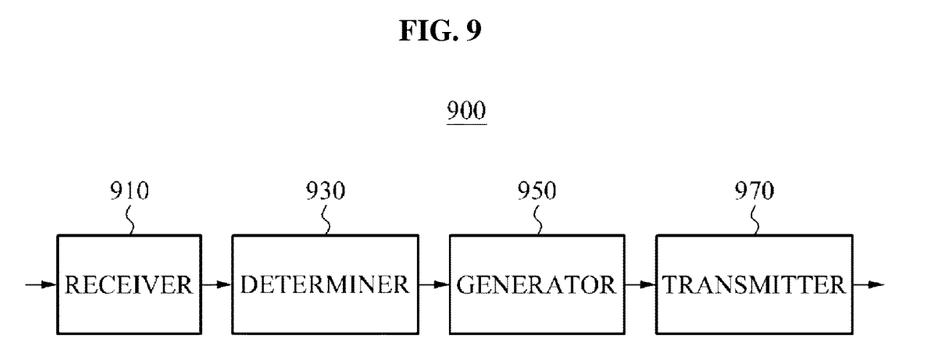
FIG. 9 is a block diagram illustrating an example of a transmission node.

FIG. 9 is a block diagram illustrating an example of a transmission node 900. Referring to FIG. 9, the transmission node 900 according to the example includes a receiver 910, a determiner 930, a generator 950, and a transmitter 970.

The receiver 910 receives, from a reception node, scheduling information including a reception available time period of the reception node.

The determiner 930 determines whether a transmission unavailable time period of the transmission node 900 is present in the reception available time period received by the receiver 910.

The generator 950 generates information of the transmission unavailable time period in the reception available time period of the reception node when the determiner 930 determines that the transmission unavailable time period is present in the reception available time period. The generator 950 may generate the information of the transmission unavailable time in at least one of a bitmap format, a form of a number of unit times, and a form of an indicator.

The transmitter 970 transmits, to the reception node, the information of the transmission unavailable time generated by the generator 950. The transmitter 970 transmits, to the reception node, the information of the transmission unavailable time in addition to or along with data to be transmitted to the reception node.

Figure 10:
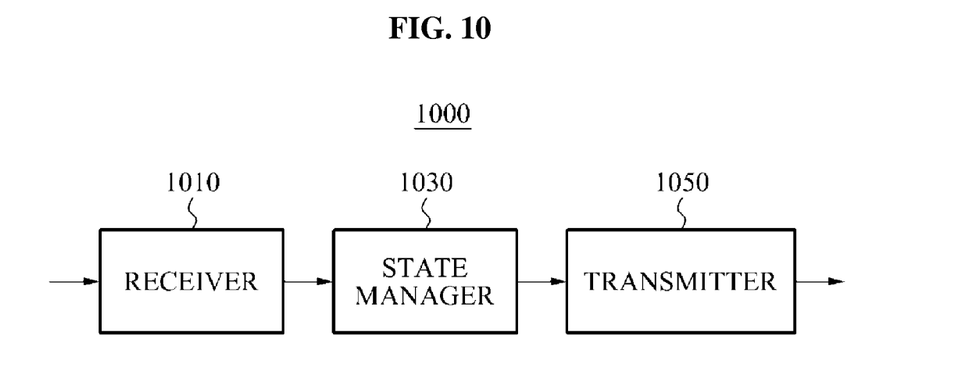
FIG. 10 is a block diagram illustrating an example of a reception node.

FIG. 10 is a block diagram illustrating an example of a reception node 1000. Referring to FIG. 10, the reception node 1000 according to the example includes a receiver 1010, a state manager 1030, and a transmitter 1050.

The receiver 1010 receives, from a transmission node, information of a transmission unavailable time period of the transmission node in the reception available time period of the reception node 1000. The information of the transmission unavailable time period may be received in at least one of a bitmap format, a form of a number of unit times, and a form of an indicator.

The state manager 1030 maintains an operation state of the reception node 1000 to be in a sleep state during a period of time corresponding to the transmission unavailable time period in the reception available time period.

The transmitter 1050 transmits, to the transmission node, scheduling information including reception available time periods of the reception node 1000.

The various elements and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communication method of a transmission node, comprising:
   receiving, from a reception node, a receiver initiated transmission data request message, requesting the transmission node transmit data to the reception node during a reception available time period of the reception node, and including scheduling information indicating the reception available time period of the reception node, the reception available time period being a time period that the reception node is able to receive data;
   generating information of a transmission unavailable time period of the transmission node in the reception available time period, the transmission unavailable time period being a time period that the transmission node is unable to transmit data; and
   transmitting, to the reception node, the information of the transmission unavailable time period,
   wherein the reception node operates in a sleep state based on the information of the transmission unavailable time period, and
   wherein the receiver initiated transmission data request is transmitted in an institute of Electrical and Electronics Engineers (IEEE) 802.15.4 Receiver initiated Transmission (RIT).

2. The method of claim 1, wherein the transmitting comprises transmitting, to the reception node, the information of the transmission unavailable time period, along with data.

3. The method of claim 1, further comprising: determining whether the transmission unavailable time period is present in the reception available time period.

4. The method of claim 3, wherein the generating comprises generating the information of the transmission unavailable time period in a reception available time period of the reception node based on a result of the determining.

5. The method of claim 1, wherein the generating comprises generating the information of the transmission unavailable time period in a bitmap format.

6. The method of claim 1, wherein the generating comprises generating the information of the transmission unavailable time period in a form of a number of unit times in which transmission is unavailable until a subsequent transmission.

7. The method of claim 1, wherein the generating comprises generating the information of the transmission unavailable time period in a form of an indicator.

8. The method of claim 7, wherein the indicator indicates that a corresponding data transmission is a final transmission in the reception available time period.

9. The method of claim 1, wherein the transmission node and the reception node operate in a non-beacon mode in which a beacon is not used.

10. A non-transitory computer-readable storage medium storing a program comprising instructions to cause a computer to perform the method of claim 1.

11. The method of claim 1, wherein the scheduling information comprising a reception available time period is transmitted using an unslotted carrier sense multiple access with collision avoidance (CSMA/CA) transmission.

12. The method of claim 1, wherein the transmitting node and the reception node form a Personal Area Network (PAN).

13. The method of claim 1, wherein the scheduling information further comprises the number of times the listen interval will be repeated in a bitmap format.

14. The method of claim 13, wherein the transmission unavailable time period further comprises the number of listen intervals, within the number of times the listen interval will be repeated, that the transmission node will not transmit data to the reception node, and wherein the number of listen intervals is in the bitmap format.

15. A communication method of a reception node, comprising:
   transmitting, to a transmission node, a receiver initiated transmission data request message, requesting the transmission node transmit data to the reception node during a reception available time period of the reception node, and including scheduling information indicating the reception available time period of the reception node, the reception available time period being a time period that the reception node is able to receive data;
   receiving, from the transmission node, information of a transmission unavailable time period of the transmission node in the reception available time period of the reception node, the transmission unavailable time period being a time period that the transmission node is unable to transmit data; and
   operating in a sleep state during the transmission unavailable time period,
   wherein the receiver initiated transmission data request is transmitted in an institute of Electrical and Electronics Engineers (IEEE) 802.15.4 Receiver initiated transmission (RIT).

16. The method of claim 15, wherein the transmitting comprises periodically transmitting the scheduling information to the transmission node.

17. The method of claim 15, wherein the information of the transmission unavailable time period is in at least one of a bitmap format, a form of a number of unit times in which transmission is unavailable until a subsequent transmission, and a form of an indicator.

18. A non-transitory computer-readable storage medium storing a program comprising instructions to cause a computer to perform the method of claim 15.

19. A transmission node, comprising:
- a receiver configured to receive, from a reception node, a receiver initiated transmission data request message, requesting the transmission node transmit data to the reception node during a reception available time period of the reception node, and including scheduling information indicating the reception available time period, of the reception node, the reception available time period being a time period that the reception node is able to receive data;
- a generator configured to generate information of a transmission unavailable time period of the transmission node in the reception available time period, the transmission unavailable time period being a time period that the transmission node is unable to transmit data; and
- a transmitter configured to transmit, to the reception node, the information of the transmission unavailable time period,
- wherein the reception node operates in a sleep state based on the information of the transmission unavailable time period,
- wherein the receiver initiated transmission data request is transmitted in an institute of Electrical and Electronics Engineers (IEEE) 802.15.4 Receiver initiated transmission (RIT).

20. The transmission node of claim 19, wherein the transmitter is configured to transmit, to the reception node, the information of the transmission unavailable time period, along with data.

21. The transmission node of claim 19, wherein the generator is configured to generate the information of the transmission unavailable time period in at least one of a bitmap format, a form of a number of unit times in which transmission is unavailable until a subsequent transmission, and a form of an indicator.

22. A reception node, comprising:
- a transmitter configured to transmit, to a transmission node, a receiver initiated transmission data request message, requesting the transmission node transmit data to the reception node during a reception available time period of the reception node, and including scheduling information indicating the reception available time period of the reception node, the reception available time period being a time period that the reception node is able to receive data; and
- a state manager configured to maintain the reception node in a sleep state during a transmission unavailable time period of the transmission node in the reception available time period, the transmission unavailable time period being a time period that the transmission node is unable to transmit data,
- wherein the receiver initiated transmission data request is transmitted in an institute of Electrical and Electronics Engineers (IEEE) 802.15.4 Receiver initiated transmission (RIT).

23. The reception node of claim 22, further comprising:
- a receiver configured to receive, from the transmission node, information of the transmission unavailable time period.

24. The reception node of claim 22, wherein the reception node is unavailable for reception in the sleep state.

* * * * *